United States Patent
Tang et al.

(10) Patent No.: US 11,418,076 B2
(45) Date of Patent: Aug. 16, 2022

(54) ELECTRIC MACHINE ROTOR

(71) Applicant: FORD GLOBAL TECHNOLOGIES, LLC, Dearborn, MI (US)

(72) Inventors: Chun Tang, Canton, MI (US); Cyrille Goldstein, Ferndale, MI (US); Jacob Krizan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 780 days.

(21) Appl. No.: 16/019,051

(22) Filed: Jun. 26, 2018

(65) Prior Publication Data

US 2019/0393747 A1 Dec. 26, 2019

(51) Int. Cl.
| | |
|---|---|
| *H02K 9/19* | (2006.01) |
| *H02K 1/32* | (2006.01) |
| *H02K 1/274* | (2022.01) |
| *H02K 5/20* | (2006.01) |
| *H02K 5/15* | (2006.01) |

(52) U.S. Cl.
CPC ............ *H02K 1/32* (2013.01); *H02K 1/274* (2013.01); *H02K 5/20* (2013.01); *H02K 9/19* (2013.01); *H02K 5/15* (2013.01)

(58) Field of Classification Search
CPC .......... H02K 1/32; H02K 1/27; H02K 1/274; H02K 5/15; H02K 5/20; H02K 9/19; H02K 9/16; H02K 9/18; H02K 9/197; H02K 9/20; H02K 9/06; H02K 9/14; H02K 5/02; H02K 5/04; H02K 5/08
See application file for complete search history.

(56) References Cited

U.S. PATENT DOCUMENTS

| | | | |
|---|---|---|---|
| 8,084,902 B2 | 12/2011 | Lemmers, Jr. et al. | |
| 8,138,642 B2 | 3/2012 | Lemmers, Jr. et al. | |
| 2014/0009013 A1 | 1/2014 | Chamberlin et al. | |
| 2014/0103767 A1* | 4/2014 | Nadeau | H02K 1/2773 310/156.02 |
| 2017/0030335 A1* | 2/2017 | Deicke | F03D 15/00 |
| 2017/0133912 A1* | 5/2017 | Gi | H02K 9/19 |
| 2017/0201154 A1* | 7/2017 | Brassitos | F16C 19/546 |

\* cited by examiner

*Primary Examiner* — Bryan R Perez
(74) *Attorney, Agent, or Firm* — David B Kelley; Brooks Kushman P.C.

(57) ABSTRACT

An electric machine rotor includes a core, a first end plate, a second end plate, and a shaft. The core defines an internal cavity. The first and second end plates each define a central orifice and are respectively secured to opposing axial ends of the core. The shaft is disposed within the cavity and engages the first and second end plates within the central orifices to facilitate synchronized rotation of and torque transfer between the core and shaft.

19 Claims, 4 Drawing Sheets

ELECTRIC MACHINE ROTOR

TECHNICAL FIELD

The present disclosure relates to electric machines, including motors and/or generators.

BACKGROUND

Electric machines, including motors, generators, and combination motor/generators include a rotor that is configured to rotate within in a stator to convert electrical energy into rotational kinetic energy.

SUMMARY

An electric machine rotor includes a cylindrical core, end plates, and a shaft. The cylindrical core defines an internal cavity. The end plates define central orifices and are secured to opposing axial ends of the core. The shaft is disposed within the cavity, extends outward from the cavity through each orifice, and engages the orifices via interference-fits such that the end plates facilitate synchronized rotation of and torque transfer between the core and shaft.

An electric machine rotor includes a core, end plates, and a shaft. The core has inner and outer diameters. The inner diameter defines an internal cavity. The end plates define keyed orifices and are secured to opposing axial ends of the core between the inner and outer diameters. The shaft is disposed within the cavity, extends outward through each orifice, and has keyed sections that engage the keyed orifices such that the end plates facilitate torque transfer between the core and shaft.

An electric machine rotor includes a core, a first end plate, a second end plate, and a shaft. The core defines an internal cavity. The first and second end plates each define a central orifice and are respectively secured to opposing axial ends of the core. The shaft is disposed within the cavity and engages the first and second end plates within the central orifices to facilitate synchronized rotation of and torque transfer between the core and shaft.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
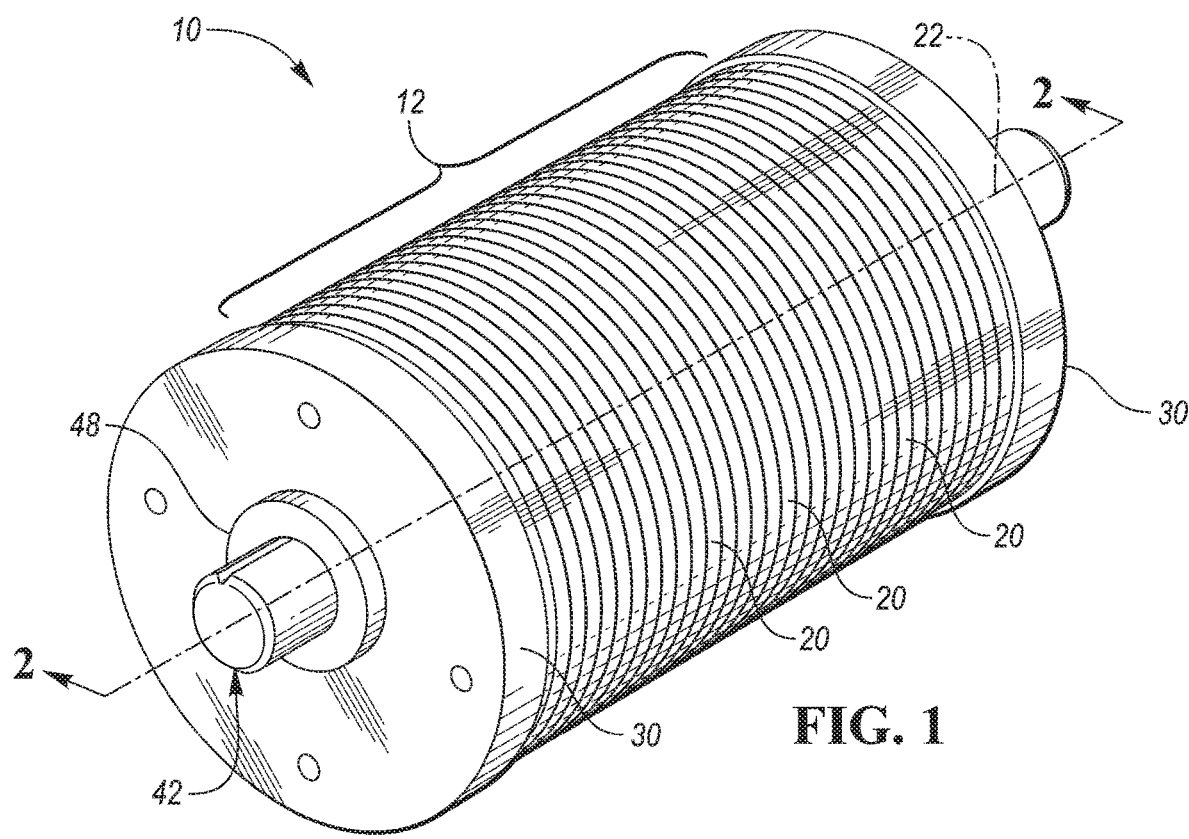
FIG. 1 is an isometric view of a rotor for an electric machine.
Figure 2:
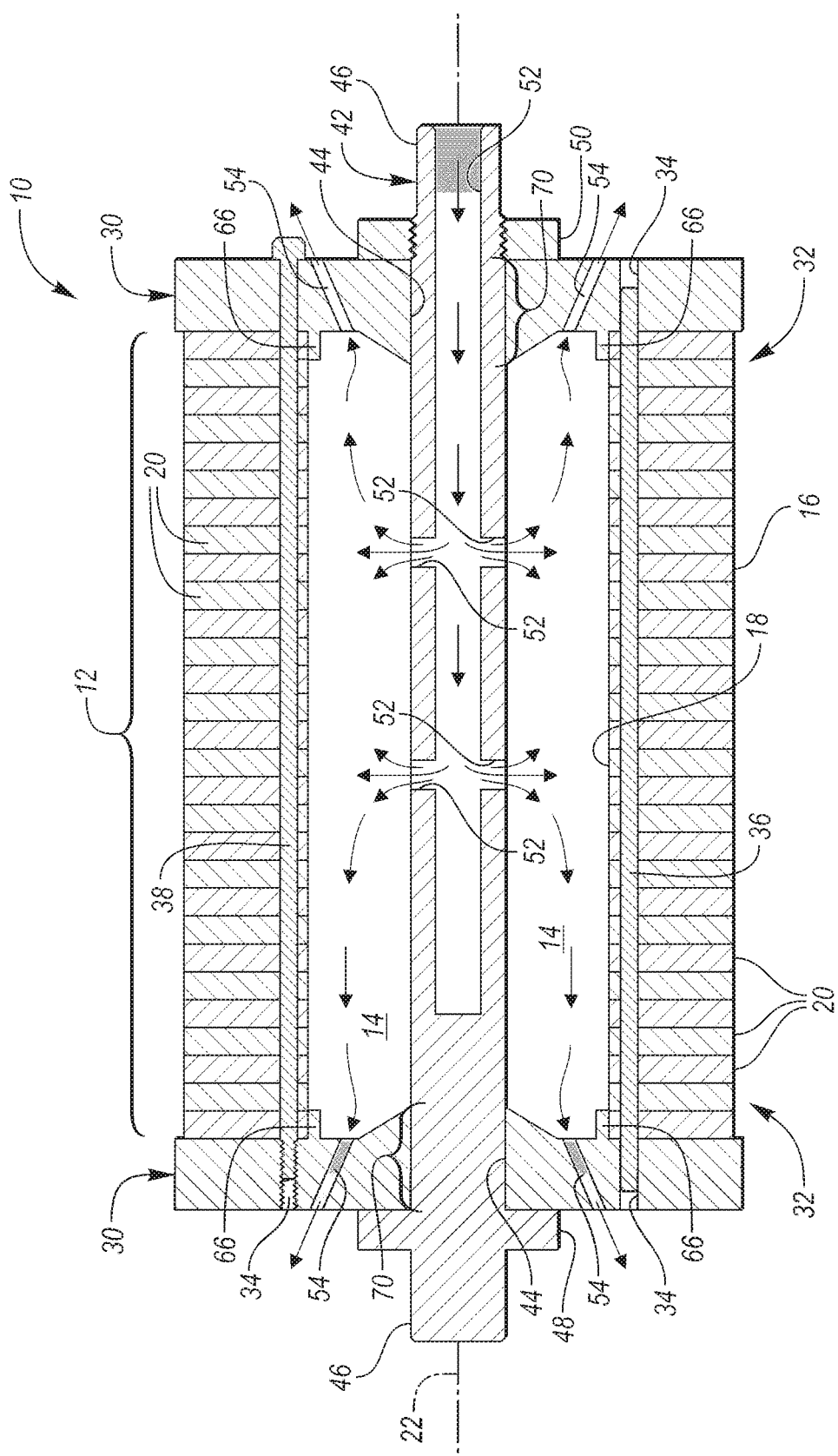
FIG. 2 is a cross-sectional view taken along line 2-2 in FIG. 1.

Referring to FIGS. 1 and 2, a rotor 10 for an electric machine is illustrated. The electric machine may be an electric motor, an electric generator, or a combination motor/generator. The electric machine may be utilized in the powertrain of an electric or hybrid vehicle to provide propulsion power for the vehicle. The rotor 10 includes a cylindrical core 12 the defines an internal cavity 14. More specifically, the core 12 includes an outer diameter 16 and an inner diameter 18 that defines the internal cavity 14. The core 12 is comprised of a plurality of laminate plates 20 that are sequentially stacked in an axial direction along an axis of rotation 22 of the rotor 10.

Figure 3:
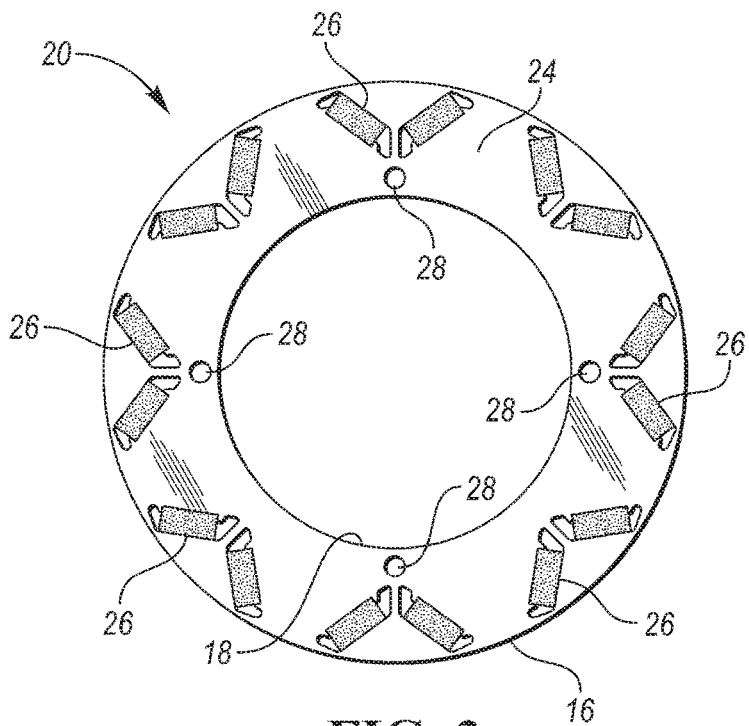
FIG. 3 is a front view one of a plurality of laminate plates that comprise a core of the rotor.
Figure 4:
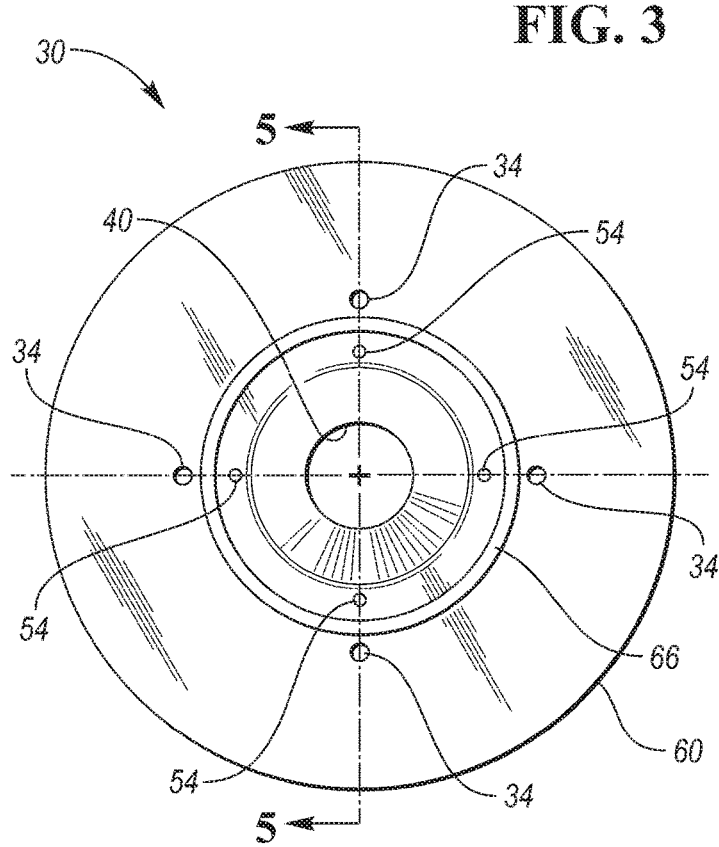
FIG. 4 is a front view of an end plate of the rotor.
Figure 5:
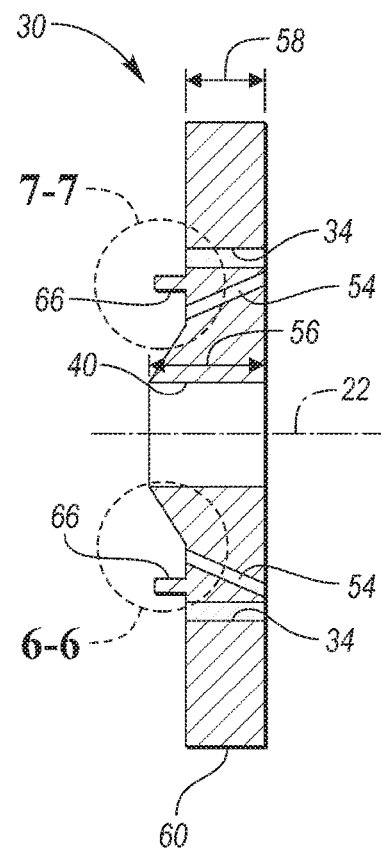
FIG. 5 is a cross-sectional view taken along line 5-5 in FIG. 4.

Referring to FIG. 3, a front view of the one of the laminate plates 20 is illustrated. The laminate plates 20 are individually fabricated from a material such iron or steel. Each laminate plate 20 includes an iron or steel plate 24 and a plurality of permanent magnets 26 that are secured to the iron or steel plate 24. The laminate plates 20 are then aligned in an axial direction along the axis of rotation 22 to form the cylindrical core 12. The iron or steel plates 24 may define through holes 28 that are configured to receive dowels or fasteners to properly align the plurality of laminate plates 20 to form the cylindrical core (see FIGS. 1 and 2). The laminate plates 20 may be stacked "loose", welded, or bonded together depending the desired application. The laminate plates 20 may include a thin layer of insulating material (e.g., a thin layer of epoxy that is approximately 0.001 mm thick). Although not depicted in FIGS. 1 and 2, there may be small spaces between adjacent laminate plates 20 at locations where the adjacent laminate plates 20 are not affixed to each other, if the application requires the adjacent laminate plates 20 to be affixed to each other (i.e., via welding or bonding).

Referring to FIGS. 1, 2, 4, and 5, end plates 30 (which may also be referred to as the first and second end plates) may be secured to opposing axial ends 32 of the core 12 between the inner diameter 18 and the outer diameter 16 of the core 12. Securing the end plates 30 to the core 12 facilitates synchronized rotation and torque transfer between the end plates 30 and the core 12. The end plates 30 may define fastening orifices 34 that are configured to align with the through holes 28 defined by the plurality of laminate plates 20. Dowels 36 may be disposed within the fastening orifices 34 of the end plates 30 and the through holes 28 defined by the laminate plates 20 in order to secure the end plates 30 to the opposing axial ends 32 of the core 12. Each dowel 36 may be disposed within one fastening orifice 34 defined by the first end plate 30, within one through hole 28 defined by each of the laminate plates 20, and within one fastening orifice defined by the second end plate 30. More specifically, each dowel 36 may engage one fastening orifice 34 defined by the first end plate 30 via a clearance-fit (i.e., slip-fit), engage one through hole 28 defined by each of the laminate plates 20 via a clearance-fit, and engage one fastening orifice 34 defined by the second end plate 30 via an interference-fit (i.e., press-fit).

Alternatively, shoulder bolts 38 may disposed within the fastening orifices 34 of the end plates 30 and the through holes 28 defined by the laminate plates 20 in order to secure the end plates 30 to the opposing axial ends 32 of the core 12. Each shoulder bolt 38 may be disposed within one fastening orifice 34 defined by the first end plate 30, within one through hole 28 defined by each of the laminate plates 20, and within one fastening orifice defined by the second end plate 30. More specifically, each shoulder bolt 38 may engage one fastening orifice 34 defined by the first end plate 30 via a clearance-fit, engage one through hole 28 defined by each of the laminate plates 20 via a clearance-fit, and engage one fastening orifice 34 defined by the second end plate 30 via threads of the shoulder bolt 38, wherein the fastening orifice 34 defined by the second end plate 30 is a tapped orifice. It should be noted that although FIG. 2 depicts one dowel 36 and one shoulder bolt 38, dowels alone, shoulder bolts alone, or any combination of dowels and shoulder bolts may be utilized to secure the end plates 30 to the core 12.

The end plates 30 each define a central orifice 40. A shaft 42 is disposed within the cavity 14 and engages each of the end plates 30 within the central orifices 40 in order to facilitate synchronized rotation of and torque transfer between the core 12 and the shaft 42 via the end plates 30. In order to facilitate synchronized rotation of and torque transfer between the core 12 and the shaft 42 via the end plates 30, the shaft 42 may engage at least one of the central orifices via an interference-fit 44. The shaft 42 may extend outward from the cavity 14 through each central orifice 40 such that ends 46 of the shaft 42 are disposed on an exterior of the end plates 30. The ends 46 of the shaft 42 may be secured to bearings (not shown) within a stator (not shown) of the electric machine in order to facilitate rotation of the rotor 10.

The shaft 42 may include a shoulder 48 disposed on one end 46 that is configured to engage one of the end plates 30. A retaining nut 50 may engage a threaded portion of the shaft 42 on an opposing end 46 of the shaft 42 relative to the shoulder 48, and engage the other of the end plates 30. The shoulder 48 and retaining nut 50 combination are configured to engage the end plates 30 to prevent axial movement of the shaft 42 relative to the end plates 30 and the core 12. A retaining ring that engages a groove defined on the exterior of the shaft 42 may be utilized as opposed to the retaining nut 50 in order to engage the other of the end plates 30 and prevent axial movement of the shaft 42 in combination with the shoulder 48.

The internal cavity 14 defined by the core 12 provides a space or gap between the shaft 42 and the core 12 (or more specifically the laminate plates 20). The shaft 42 may define a fluid circuit 52 that is configured to deliver lubricating and/or cooling fluid from a fluid source (not shown) to the internal cavity 14 and directly onto the core 12 (or more specifically the laminate plates 20) in order to cool the core 12. More specifically, the lubricating and/or cooling fluid may flow across the inner diameter 18 of the core 12 within the cavity 14 in order to cool the core 12. The lubricating and/or cooling fluid is then transferred out of the cavity 14 via fluid channels 54 defined by the end plates 30. The fluid source may be a sump (not shown). A pump (not shown) may be configured to transfer the lubricating and/or cooling fluid out of the sump and into the fluid circuit 52.

The rotor design of the current application (i.e., where a space or gap is provided between the shaft 42 and the core 12) is advantageous due to the reduction of the weight of the core, which is the result of defining a space or gap between the shaft and the core as opposed to the core including additional material that occupies that space or gap. The rotor design of the current application is also advantageous due to the increased surface area along the inner diameter 18 of the core 12 which may be directly cooled via a lubricating and/or cooling fluid that flows out of the fluid circuit 52 defined by the shaft 42 and directly onto the core 12.

Referring to FIGS. 4-6C, the end plates 30 may include a geometric feature where the end plates 30 protrude into the cavity 14 proximate the central orifices 40 such that an axial thickness 56 of the end plates 30 (i.e., the thickness of the end plates 30 in the axial direction along the axis of rotation 22) proximate the central orifices 40 is greater than an axial thickness 58 of the end plates 30 proximate outer diameters 60 of the end plates 30. Increasing the axial thickness of the end plates 30 proximate the central orifices 40 increases the interference area between the shaft 42 and the end plates 30 within the central orifices 40. Increasing the interference area between the shaft 42 and the end plates 30 in turn increases the torque transfer capability between the shaft 42 and end plates 30, and increases the stiffness of the end plates 30 which prevents or decreases the amount deformation of the end plates 30 at the regions of the end plates 30 proximate to the central orifices 40.

Figure 6A:
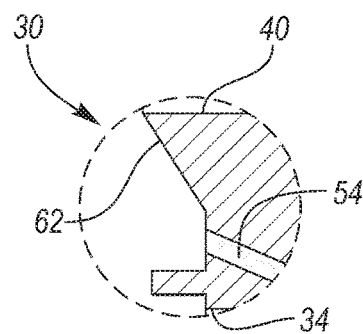
FIGS. 6A-6C are magnified views of area 6-6 in FIG. 5 illustrating alternative embodiments of a geometric feature of the end plate.
Figure 6B:
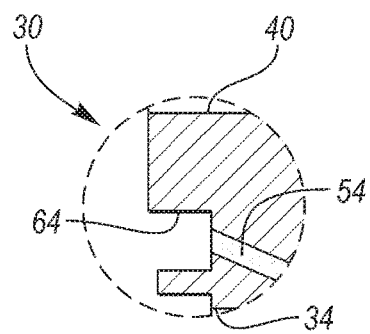
Figure 6C:
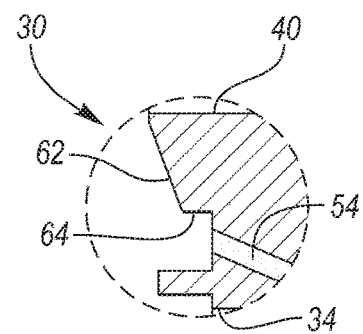

FIGS. 6A-6C illustrate alternative embodiments of the geometric feature where the end plates 30 protrude into the cavity 14 proximate the central orifices 40 such that the axial thickness of the end plates is increased proximate the central orifices 40. FIG. 6A illustrates a first embodiment where the geometric feature includes a tapered surface 62 that gradually increases the axial thickness of the end plates 30 from the axial thickness 58 proximate outer diameters 60 to the axial thickness 56 proximate the central orifices 40. FIG. 6B illustrates a second embodiment where the geometric feature includes a stepped surface 64 that increases the axial thickness of the end plates 30 from the axial thickness 58 proximate outer diameters 60 to the axial thickness 56 proximate the central orifices 40. FIG. 6C illustrates a third embodiment where the geometric feature includes both a tapered surface 62 and a stepped surface 64 that each increase the axial thickness of the end plates 30 from the axial thickness 58 proximate outer diameters 60 to the axial thickness 56 proximate the central orifices 40.

Referring to FIGS. 2, 4-5, and 7A-7C, the end plates 30 may include or define retaining features 66 that are configured to maintain the position of the core 12 relative to the end plates 30. The retaining features 66 are protrusions that are disposed on the end plates 30 radially outward of the central orifices 40. The retaining features 66 may be integral to the ends plates 30. The retaining features 66 extend axially (i.e., in the axial direction along an axis of rotation 22) from an internal surface of the end plates and into the cavity 14. Specifically, the retaining features 66 may engage the inner diameter 18 of the core 12 to maintain the position the core 12 relative to the end plates 30.

Figure 7A:
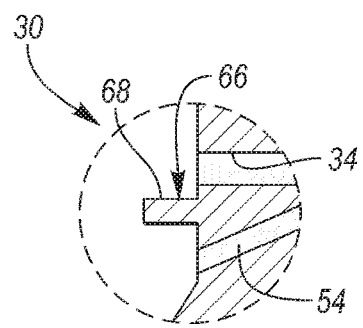
FIGS. 7A-7C are magnified views of area 7-7 in FIG. 5 illustrating alternative embodiments of a core retaining feature.
Figure 7B:
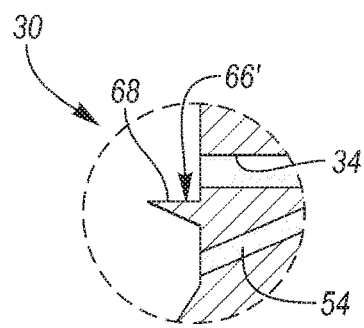
Figure 7C:
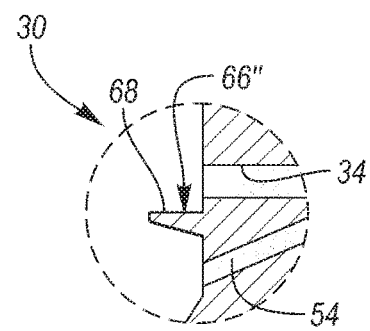

FIGS. 7A, 7B, and 7C illustrate alternative embodiments of the retaining features, i.e., retaining features 66, 66', and 66". Each retaining feature 66, 66', and 66" includes a top or outer surface 68 that engages the inner diameter 18 of the core 12 to maintain position the core 12 relative to the end plates 30. The retaining feature 66 depicted in FIG. 7A has a rectangular shaped cross-section, the retaining feature 66' depicted in FIG. 7B has a triangular shaped cross-section, and the retaining feature 66" depicted in FIG. 7C has a trapezoidal shaped cross-section.

Figure 8:
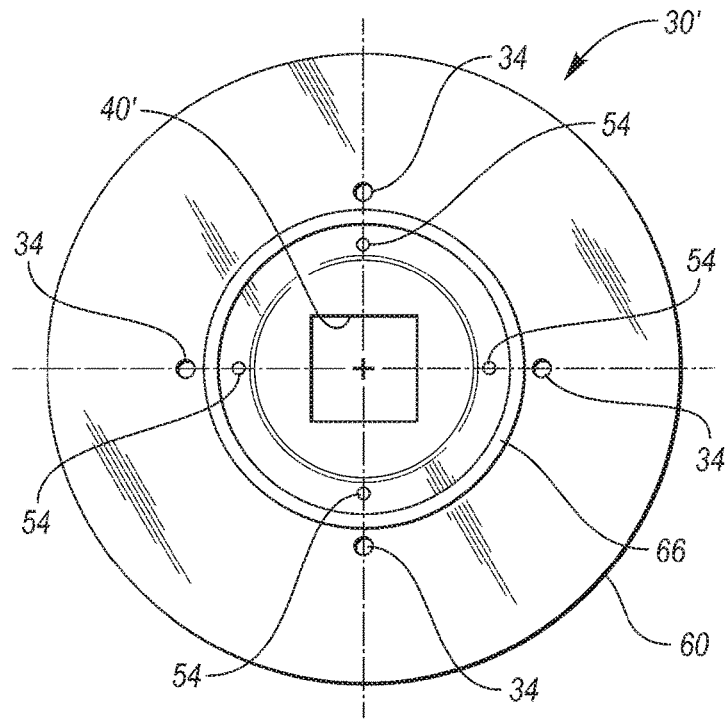
FIG. 8 is a front view of an alternative embodiment of the end plate.

Referring to FIG. 8, a front view of an alternative embodiment of the end plates 30' is illustrated. The elements of the alternative embodiment of the end plates 30' depicted in FIG. 8 that are common to elements of the end plates 30 depicted in FIGS. 1, 2, 4, and 5 will have the same structure and functionally as described with respect to end plates 30 unless otherwise stated herein. The central orifice 40' of the alternative embodiment of the end plates 30' has a polygonal shape as opposed to the circular shape depicted in FIG. 4. The central orifice 40' depicted in FIG. 8 may be referred to as a keyed orifice 40'. The shaft 42 may include keyed sections 70 (See FIG. 2) that engage the keyed orifices 40' in order to facilitate synchronized rotation of and torque transfer between the core 12 and the shaft 42 via the end plates 30'. The engagement between the keyed sections 70 and the keyed orifices 40' may be referred to as a keyed engagement. A keyed engagement is an engagement between a shaft, pin, bolt, wedge, or other component and a hole, slot, orifice, space, etc. that locks or holds two or more parts of a mechanism or structure together.

The keyed sections 70 may have cross-sectional areas that have polygonal shapes that match and mate with the polygonal shapes of the keyed orifices 40' in order to facilitate synchronized rotation of and torque transfer between the core 12 and the shaft 42 via the end plates 30'. For example, if the keyed orifices 40' have square shapes, the keyed sections 70 will also have square shapes that are configured and sized to fit within the keyed orifices 40'. Although the keyed sections 70 should be sized to fit within the keyed orifices 40', the keyed sections 70 should also be sized to engage the end plates 30' when rotated within the keyed orifices 40' to facilitate synchronized rotation between the shaft 42 and the end plates 30'. The keyed sections 70 should not be size to freely rotate within the keyed orifices 40' once inserted therein. The keyed sections 70 may engage the keyed orifices 40' via interference-fits (i.e., press-fits) or clearance-fits (i.e., slip-fits). Although FIG. 8 illustrates the keyed orifices 40' as being square in shape, it should be understood that the they keyed orifices 40' and the keyed sections may have any matching polygonal shape such as, but not limited to, triangles, squares, rectangles, pentagons, hexagons, heptagons, octagons, nonagons, decagons, etc.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine rotor comprising:
   a cylindrical core defining a central cavity along an inner diameter of the cylindrical core, the central cavity extending axially between opposing axial ends of the cylindrical core;
   end plates defining central orifices that are aligned axially with the central cavity, wherein the end plates are secured to opposing axial ends of the cylindrical core and define axially protruding rings, wherein the axially protruding rings are disposed radially outward of the central orifices, are disposed radially inward of outer diameters of the end plates, extend axially into the central cavity from the opposing axial ends of the cylindrical core, and have outer diameters that engage the inner diameter of the cylindrical core to maintain the position of the cylindrical core relative to the end plates; and
   a shaft disposed within the cavity, extending outward from the cavity through each orifice, and engaging the orifices via interference-fits such that the end plates facilitate synchronized rotation of and torque transfer between the core and shaft.

2. The rotor of claim 1, wherein the central orifices are keyed orifices, the shaft includes keyed sections, and wherein the keyed sections engage the keyed orifices such that the end plates facilitate synchronized rotation of and torque transfer between the core and the shaft.

3. The rotor of claim 2, wherein the keyed sections and the keyed orifices have mating polygonal shapes.

4. The rotor of claim 1, wherein the end plates protrude into the cavity proximate the central orifices such that axial thickness of the end plates proximate the central orifices is greater than axial thickness of the end plates proximate outer diameters of the end plates.

5. The rotor of claim 1, wherein the end plates are secured to the core via dowel pins.

6. The rotor of claim 1, wherein the end plates are secured to the core via shoulder bolts.

7. An electric machine rotor comprising:
   a core having inner and outer diameters, the inner diameter defining a central cavity that extends between opposing axial ends of the core;
   end plates defining keyed orifices that are aligned axially with the central cavity, wherein the end plates are secured to the opposing axial ends of the core between the inner and outer diameters of the core and define axially extending protrusions, wherein the axially extending protrusions are disposed radially outward of the keyed orifices, are disposed radially inward of outer diameters of the end plates, extend axially into the central cavity from the opposing axial ends of the core, and have outer surfaces that engage the inner diameter of the core to maintain the position of the core relative to the end plates; and
   a shaft disposed within the cavity, extending outward through each orifice, and having keyed sections engaging the keyed orifices such that the end plates facilitate torque transfer between the core and shaft.

8. The rotor of claim 7, wherein the keyed sections engage the keyed orifices via interference-fits.

9. The rotor of claim 7, wherein the keyed sections and the keyed orifices have mating polygonal shapes.

10. The rotor of claim 7, wherein the end plates protrude into the cavity proximate the central orifices such that axial thickness of the end plates proximate the central orifices is greater than axial thickness of the end plates proximate outer diameters of the end plates.

11. The rotor of claim 7, wherein the end plates are secured to the core via dowel pins.

12. The rotor of claim 7, wherein the end plates are secured to the core via shoulder bolts.

13. The rotor of claim 7, wherein the axially extending protrusions are axially protruding rings, and wherein the outer surfaces are outer diameters of the axially protruding rings.

14. An electric machine rotor comprising:
a core defining a central cavity, the central cavity extending axially between opposing axial ends of the core;
first and second end plates defining first and second central orifices, respectively, that are axially aligned with the central cavity, wherein the first and second end plates are secured to opposing axial ends of the core, respectively, and define first and second axially extending protrusions, respectively, wherein the first and second axially extending protrusions are disposed radially outward of the first and second central orifices, respectively, are disposed radially inward of first and second outer diameters of the first and second end plates, respectively, extend axially into the central cavity from the opposing axial ends of the core, respectively, and have first and second outer surfaces that each engage the inner diameter of the core to maintain the position of the core relative to the end plates; and
a shaft disposed within the cavity and engaging the first and second end plates within the central orifices to facilitate synchronized rotation of and torque transfer between the core and shaft.

15. The rotor of claim 14, wherein the central orifices are keyed orifices, the shaft includes keyed sections, and wherein the keyed sections engage the keyed orifices such that the first and second end plates facilitate synchronized rotation of and torque transfer between the core and shaft.

16. The rotor of claim 15, wherein the keyed sections and the keyed orifices have mating polygonal shapes.

17. The rotor of claim 14, wherein the shaft engages the first and second end plates within the central orifices via interference-fits such that the first and second end plates facilitate synchronized rotation of and torque transfer between the core shaft.

18. The rotor of claim 14, wherein the end plates protrude into the cavity proximate the central orifices such that axial thickness of the end plates proximate the central orifices is greater than axial thickness of the end plates proximate outer diameters of the end plates.

19. The rotor of claim 14, wherein the first and second axially extending protrusions are axially protruding rings, and wherein the first and second outer surfaces are outer diameters of the first and second axially protruding rings, respectively.

* * * * *